US012545025B2

(12) United States Patent
Miyachi

(10) Patent No.: US 12,545,025 B2
(45) Date of Patent: Feb. 10, 2026

(54) DROPLET EJECTION CONTROL APPARATUS

(71) Applicant: RISO KAGAKU CORPORATION, Tokyo (JP)

(72) Inventor: Ryosuke Miyachi, Tokyo (JP)

(73) Assignee: RISO KAGAKU CORPORATION, Tokyo (JP)

(*) Notice: Subject to any disclaimer, the term of this patent is extended or adjusted under 35 U.S.C. 154(b) by 190 days.

(21) Appl. No.: 18/369,263

(22) Filed: Sep. 18, 2023

(65) Prior Publication Data

US 2024/0109316 A1 Apr. 4, 2024

(30) Foreign Application Priority Data

Sep. 29, 2022 (JP) ................................ 2022-155733

(51) Int. Cl.
*B41J 2/045* (2006.01)
*B41J 2/155* (2006.01)
*B41J 2/21* (2006.01)

(52) U.S. Cl.
CPC ........... *B41J 2/04593* (2013.01); *B41J 2/155* (2013.01)

(58) Field of Classification Search
CPC ...... B41J 2/04593; B41J 2/155; B41J 2/2135; B41J 2/2146
See application file for complete search history.

(56) References Cited

U.S. PATENT DOCUMENTS

| | | | | |
|---|---|---|---|---|
| 6,196,668 | B1 | 3/2001 | Bode | |
| 7,661,810 | B2 | 2/2010 | Takatsuka | |
| 7,988,254 | B2 | 8/2011 | Takatsuka | |
| 7,988,272 | B2 | 8/2011 | Takatsuka | |
| 8,029,127 | B2 | 10/2011 | Takatsuka | |
| 2006/0197818 | A1 * | 9/2006 | Takatsuka | B41J 29/02 347/104 |
| 2020/0055310 | A1 * | 2/2020 | Wakabayashi | B41J 2/155 |

FOREIGN PATENT DOCUMENTS

| | | |
|---|---|---|
| JP | 2006-240022 | 9/2006 |
| JP | 3909443 | 4/2007 |

* cited by examiner

*Primary Examiner* — Jason S Uhlenhake
(74) *Attorney, Agent, or Firm* — Greenblum & Bernstein, P.L.C.

(57) ABSTRACT

A droplet ejection control apparatus includes a head unit in which a plurality of vertically arranged nozzle groups in which a plurality of nozzles for ejecting droplets onto a predetermined target of ejection are arranged in the vertical direction; and a control unit for controlling ejection of the droplets from the nozzles. The control unit controls ejection of the droplets for vertically adjacent nozzle groups such that an amount of ejection from at least one nozzle of a vertically upper nozzle group at a joint portion between nozzle groups is reduced, and an amount of ejection from at least one nozzle at the joint portion between the nozzle groups of a vertically lower nozzle group is increased.

5 Claims, 10 Drawing Sheets

DROPLET EJECTION CONTROL APPARATUS

CROSS-REFERENCE TO RELATED APPLICATIONS

The present application claims priority under 35 U.S.C. § 119 to Japanese Patent Application No. 2022-155733, filed on Sep. 29, 2022. The above applications are hereby expressly incorporated by reference, in these entireties, into the present application.

BACKGROUND OF THE INVENTION

1. Field of the Invention

The present disclosure is related to a droplet ejection control apparatus that ejects droplets from a plurality of vertically arranged nozzles.

2. Description of the Related Art

Conventionally, there has been proposed an inkjet printing apparatus that administers printing by ejecting ink onto a print medium.

Inkjet printers include not only inkjet printers that eject ink vertically from above onto a print medium which is disposed such that a printing surface thereof is horizontal. Inkjet printers that eject ink from a direction perpendicular to a printing surface of a print medium which is disposed such a print surface thereof is other than horizontal have also been proposed.

For example, Japanese Unexamined Patent Publication No. 2006-240022 and Japanese Patent No. 3909443 propose inkjet printing apparatuses that perform printing by ejecting ink in a horizontal direction onto a vertically oriented printing surface.

Japanese Unexamined Patent Application Publication No. 2006-240022 proposes an inkjet printing apparatus in which a common liquid chamber within one inkjet head is sectioned in the longitudinal direction thereof, and sub tanks that communicate with each of the sectioned common liquid chambers are provided, thereby substantially uniformizing hydraulic head pressure which is applied to nozzles within the one inkjet head, in order to stabilize ejection of liquid.

In addition, Japanese Patent No. 3909443 proposes an inkjet printing apparatus in which sub tanks that communicate with each of a plurality of vertically arranged inkjet heads are provided, thereby uniformizing hydraulic head pressure which is applied to each of the inkjet heads, in order to stabilize ejection of liquid.

SUMMARY OF THE INVENTION

However, Japanese Unexamined Patent Application No. 2006-240022 does not take ejection from nozzles at joint portions among the sectioned common liquid chambers into consideration, and Japanese Patent No. 3909443 does not take ejection from nozzles at joint portions among inkjet heads into consideration. That is, in both the methods disclosed in Japanese Unexamined Patent Application No. 2006-240022 and Japanese Patent No. 3909443, the pressure difference between nozzles due to the difference in hydraulic head differentials among nozzles within one inkjet head remains. As a result, the drop distance of the ink ejected from a vertically upper nozzle within one inkjet head differs from the drop distance of the ink ejected from a vertically lower nozzle, as illustrated in FIG. 9. This difference in drop distance becomes more pronounced as the distance between the inkjet head and a print medium (head gap) increases. There is a tendency for the drop distance to decrease as the number of ink drops increases, as illustrated in FIG. 9.

Therefore, in the case of an inkjet printing apparatus in which a plurality of inkjet heads are arranged in the vertical direction, for example, nozzles at the lower end of an upper inkjet head 100 and nozzles at the a higher end of a lower inkjet head 101 are adjacent to each other at the joint portion between the inkjet heads, as illustrated in FIG. 10, and there are locations where the difference in nozzle pressure between adjacent nozzles is great.

In such a case, if ink is ejected horizontally from the nozzles at the joint portion, the difference in the nozzle pressure causes a difference in the drop distance when the ink lands on the print medium. In the case that there is a large difference in pressure applied to adjacent nozzles at the joint portion, white streaks will be generated at the joint portion, resulting in deterioration of image quality.

The present disclosure has been developed in view of the foregoing circumstances. An objective of the present disclosure is to provide a droplet ejection control apparatus which is capable of suppressing the deterioration in image quality at joint portions among inkjet heads described above.

A first droplet ejection control apparatus of the present disclosure comprises a head unit having a plurality of vertically arranged nozzle groups in which a plurality of nozzles for ejecting droplets onto a predetermined target of ejection are arranged in the vertical direction; and a control unit for controlling ejection of the droplets from the nozzles; the control unit controlling ejection of the droplets for vertically adjacent nozzle groups such that an amount of ejection from at least one nozzle of a vertically upper nozzle group at a joint portion between nozzle groups is reduced, and an amount of ejection from at least one nozzle at the joint portion between the nozzle groups of a vertically lower nozzle group is increased.

A second droplet ejection control apparatus of the present disclosure comprises a head unit having a plurality of vertically arranged nozzle groups in which a plurality of nozzles for ejecting droplets are arranged in the vertical direction, and a control unit that controls ejection of the droplets from the nozzles based on dot data. The control unit shifts dot data for controlling a vertically upper nozzle group to dot data for controlling a vertically lower nozzle group, or shifts dot data for controlling the vertically lower nozzle group to dot data for controlling the vertically upper nozzle group, for vertically adjacent nozzle groups.

According to the first droplet ejection control apparatus of the present disclosure, control is exerted such that the ejection amount of at least one nozzle at the joint portion of the vertically upper nozzle group is reduced, and the ejection amount of at least one nozzle at the joint portion of the vertically lower nozzle group is increased. Therefore, it is possible to suppress deterioration of image quality at the joint portion between the nozzle groups.

According to the second droplet ejection control apparatus of the present disclosure, the dot data for controlling the vertically upper nozzle group is shifted to the dot data for controlling the vertically lower nozzle group, or the dot data for controlling the vertically lower nozzle group is shifted to the dot data for controlling the vertically upper nozzle group.

Therefore, it is possible to suppress deterioration of image quality at a joint portion between the nozzle groups.

DETAILED DESCRIPTION OF THE EMBODIMENTS

Figure 1:
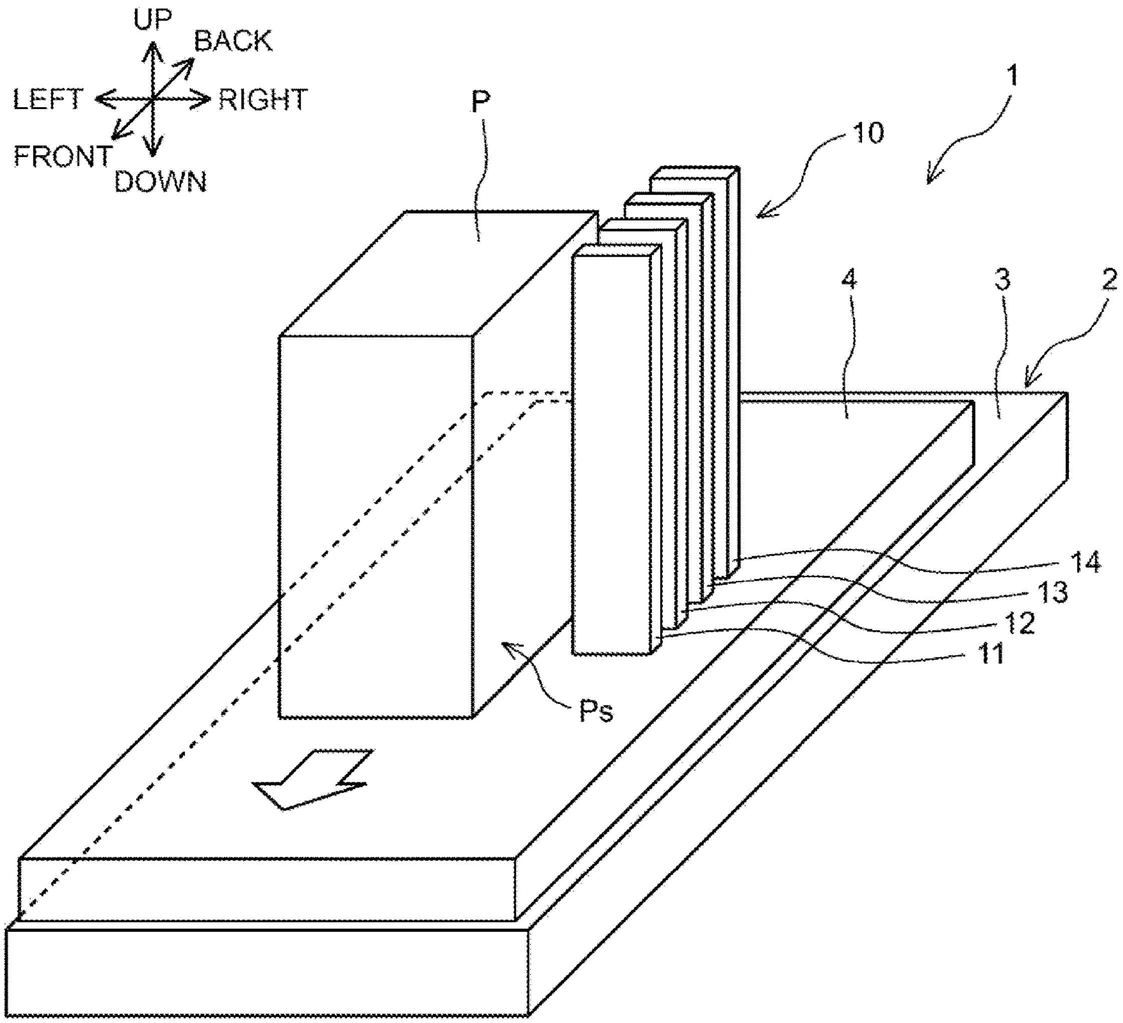
FIG. 1 is an external perspective view that illustrates the schematic configuration of a main body of an inkjet printing apparatus that employs an embodiment of the droplet ejection control apparatus of the present disclosure.

An inkjet printing apparatus that employs an embodiment of the droplet ejection control apparatus of the present disclosure will be described in detail below with reference to the attached drawings. The characteristic feature of the inkjet printing apparatus of the present embodiment is the control of ink ejection. First, the configuration of the inkjet printing apparatus as a whole will be described. FIG. 1 is an external perspective view that illustrates the schematic configuration of an inkjet printer main body 1. In the following description of the embodiment, the up, down, left, right, front and back directions indicated by arrows in FIG. 1 are designated as the up, down, left, right, front, and back directions of the inkjet printer main body 1. In addition, the up and down directions of the inkjet printer main body 1 is the vertical direction.

The inkjet printing apparatus main body 1 is equipped with a head unit 10 and a conveyance unit 2, as illustrated in FIG. 1.

The conveyance unit 2 conveys a print medium P in the direction of the arrow illustrated in FIG. 1. A three-dimensional object (for example, a box such as a cardboard box) having a print surface Ps which is oriented vertically with respect to the conveyance surface illustrated in FIG. 1 may be employed as the print medium P, for example. In the present embodiment, the print medium P corresponds to the target of ejection of the present disclosure.

The conveyance unit 2 is equipped with a support base 3 and a conveyor belt unit 4. The support base 3 is a base that supports the conveyor belt unit 4.

The conveyor belt unit 4 is equipped with two platen rollers that extend in a direction perpendicular to the conveyance direction of the print medium P, a conveyor belt, etc. The two platen rollers are arranged parallel to each other with an interval therebetween in the direction in which the print medium P is conveyed. An annular conveyor belt is stretched between the two parallel platen rollers. The platen roller rotates and the conveyor belt moves under the control of a control unit 50 to be described later. Thereby, the print medium P is transported.

The head unit 10 performs printing by ejecting ink onto the printing surface Ps of the print medium P which is conveyed by the conveyance unit 2.

The head unit 10 has four line heads 11, 12, 13, and 14, as illustrated in FIG. 1. The four line heads 11 to 14 extend in the vertical direction and are arranged parallel to the direction in which the print medium P is conveyed. In the present embodiment, each of the line heads 11 to 14 corresponds to the head unit of the present disclosure.

The four line heads 11 to 14 respectively eject C (cyan), M (magenta), Y (yellow) and K (black) ink.

Figure 2:
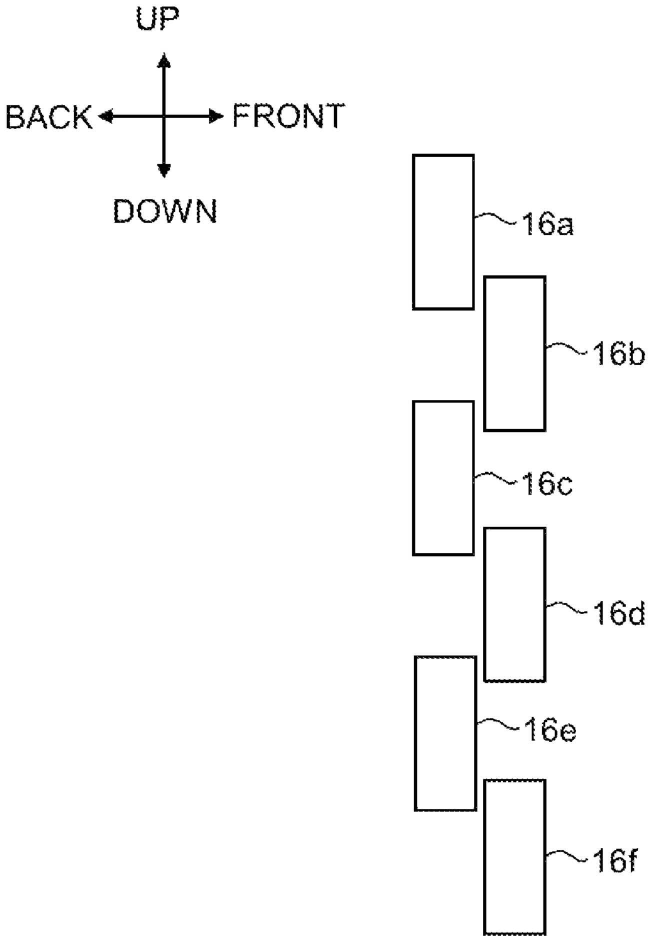
FIG. 2 is a diagram that illustrates an example of six inkjet heads of a line head.

The line heads 11 to 14 of the present embodiment each have six inkjet heads 16*a* to 16*f*, as illustrated in FIG. 2. The six inkjet heads 16*a* to 16*f* are arranged such that the ink ejection surfaces thereof are oriented in the vertical direction (the direction perpendicular to the conveyance surface of the conveyance unit 2). The ink ejection surfaces are the surfaces on which ejection openings of nozzles are arranged. Any one of the six inkjet heads 16*a* to 16*f* may also be simply referred to as the inkjet head 16 hereinafter.

In addition, the six inkjet heads 16*a* to 16*f* are arranged in a row in the vertical direction. Further, the six inkjet heads 16*a* to 16*f* are arranged in a staggered pattern. As illustrated in FIG. 2, in the present embodiment, some nozzles of vertically adjacent inkjet heads are arranged so as to overlap in the conveyance direction (the front-rear direction). Note that the inkjet heads which are adjacent to each other in the vertical direction are the inkjet heads at the closest positions in the vertical direction. In the present embodiment, the inkjet heads which are adjacent to each other in the vertical direction are the inkjet head 16*a* and the inkjet head 16*b*, the inkjet head 16*b* and the inkjet head 16*c*, the inkjet head 16*c* and the inkjet head 16*d*, and the inkjet head 16*d* and the inkjet head 16*f*.

Each of the inkjet heads 16 ejects ink supplied from an ink circulation unit 20, which will be described later.

The inkjet heads 16*a* to 16*f* have ink chambers (not shown) that store ink and a plurality of nozzles (not shown) that eject ink. A piezoelectric element (not shown) is arranged in the ink chamber. Ink is ejected from the nozzle by driving the piezoelectric element.

Straight lines that extend in the vertical direction are printed by ejecting ink from the six inkjet heads 16*a* to 16*f* arranged as described above. Control of ink ejection from each of the inkjet heads 16*a* to 16*f* will be described in detail later.

Figure 3:
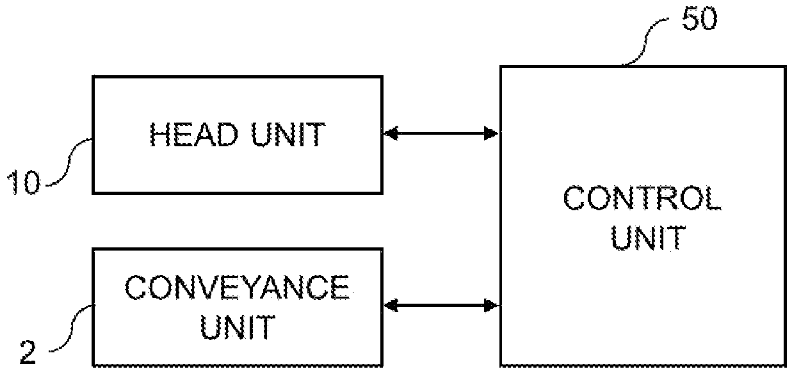
FIG. 3 is a block diagram that illustrates the configuration of a control system of the inkjet printing apparatus illustrated in FIG. 1.

FIG. 3 is a block diagram that illustrates the configuration of a control system of the inkjet printing apparatus of the present embodiment. The control unit 50 is equipped with a CPU (Central Processing Unit) and a storage medium such as a semiconductor memory or a hard disk, and controls the entire inkjet printing apparatus. The control unit 50 executes a control program stored in advance in a storage medium such as a semiconductor memory or a hard disk, and operates electric circuits to control the operation of each component of the inkjet printing apparatus.

In addition, the control unit 50 generates ink dot data based on image data to be printed, and controls the inkjet heads 16*a* to 16*f* of the line heads 11 to 14 based on the ink dot data. Ink dot data is data that defines the number of ink drops ejected from one nozzle to form one dot. In the present embodiment, the ink dot data corresponds to the dot data of the present disclosure.

In addition, the inkjet printing apparatus of the present embodiment also includes the ink circulation unit 20 which is connected to each of the line heads 11 to 14 and an ink supply unit 40 which is connected to the ink circulation unit 20.

Figure 4:
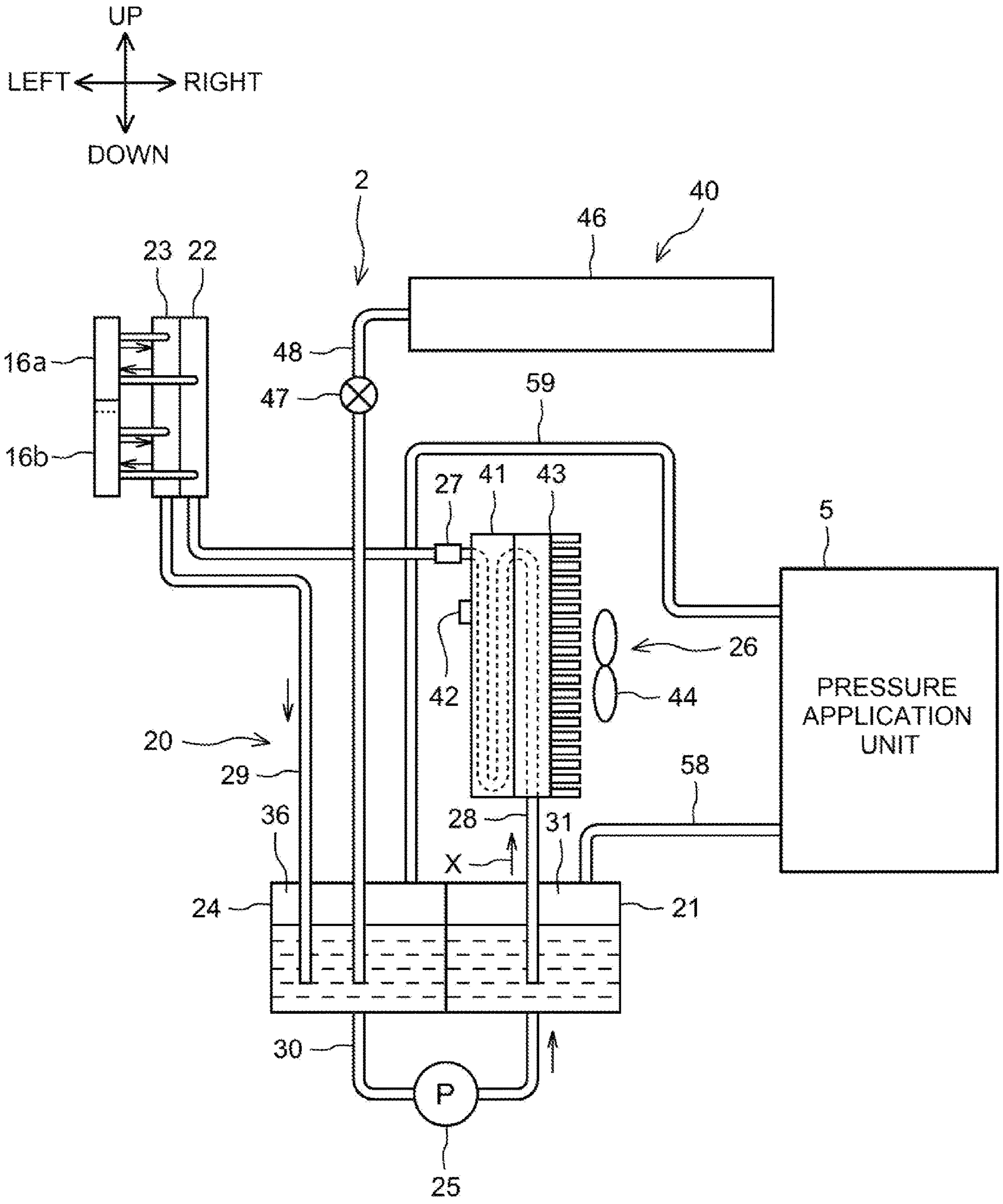
FIG. 4 is a diagram that illustrates the schematic configurations of an ink circulation unit and an ink supply unit.

FIG. 4 is a diagram that illustrates the ink circulation unit 20 which is connected to two inkjet heads 16*a* and 16*b* of the six inkjet heads 16*a* to 16*f* included in the line head 11, and an ink supply unit 40 connected to the ink circulation unit 20. Note that although only the inkjet heads 16*a* and 16*b* are illustrated in FIG. 4, the ink circulation unit 20 and the ink supply unit 40 are provided for each pair of two inkjet heads 16 in the present embodiment. That is, the ink circulation unit 20 and the ink supply unit 40 are also provided for the pair of the inkjet heads 16*c* and 16*d* and the pair of the inkjet heads 16*e* and 16*f*, respectively. Similarly, the line heads 12 to 14 other than the line head 11 are also provided with an ink circulation unit 20 and an ink supply unit 40 for each pair of the inkjet heads 16.

The ink circulation unit 20 supplies ink to the inkjet heads 16*a* and 16*b* while circulating the ink. The ink circulation unit 20 includes a pressure tank 21, a distributor 22, a collector 23, a negative pressure tank 24, an ink pump 25, an ink temperature adjusting unit 26, an ink temperature sensor 27, and ink circulation pipes 28 to 30.

The pressure tank 21 stores ink to be supplied to the inkjet heads 16*a* and 16*b*. The ink in the pressure tank 21 is supplied to the inkjet heads 16*a* and 16*b* through the ink circulation pipe 28 and the distributor 22. An air layer 31 is formed on the liquid surface of the ink in the pressure tank 21. The air layer 31 of the pressure tank 21 is connected to a pressure application unit 5 to be described later via a pressure communication pipe 58 to be described later. The pressure tank 21 is arranged at a position lower than the line heads 11 to 14.

The distributor 22 distributes the ink supplied from the pressure tank 21 through the ink circulation pipe 28 to the inkjet heads 16*a* and 16*b*.

The collector 23 collects ink which has not been ejected by the inkjet heads 16*a* and 16*b* from the inkjet heads 16*a* and 16*b*. The ink collected by collector 23 flows through ink circulation pipe 29 to the negative pressure tank 24.

The negative pressure tank 24 receives the ink which has not been ejected by the inkjet heads 16*a* and 16*b* from the collector 23 via the ink circulation pipe 29 and stores it. Further, the negative pressure tank 24 stores ink supplied from an ink cartridge 46 of the ink supply unit 40, to be described later. An air layer 36 is formed on the liquid surface of the ink in the negative pressure tank 24. The air layer 36 of the negative pressure tank 24 communicates with the pressure application unit 5 via a negative pressure communication pipe 59 to be described later. The negative pressure tank 24 is arranged at the same height as the pressure tank 21.

The ink pump 25 feeds ink from the negative pressure tank 24 to the pressure tank 21. The ink pump 25 is provided at an intermediate position of the ink circulation pipe 30.

The ink temperature adjusting unit 26 adjusts the temperature of the ink in the ink circulation unit 20. The ink temperature adjusting unit 26 is provided at an intermediate position of the ink circulation pipe 28. The ink temperature adjusting unit 26 includes a heater 41, a heater temperature sensor 42, a heat sink 43, and a cooling fan 44.

The heater 41 heats the ink inside the ink circulation pipe 28. The heater temperature sensor 42 detects the temperature of the heater 41. The heat sink 43 cools the ink inside the ink circulation pipe 28 by heat radiation. The cooling fan 44 sends cooling air to the heat sink 43.

The ink temperature sensor 27 detects the temperature of ink in the ink circulation unit 20. The ink temperature sensor 27 is provided at an intermediate position of the ink circulation pipe 28. The ink temperature sensor 27 may be constituted by a power thermistor, for example.

The ink circulation pipe 28 connects the pressure tank 21 and the distributor 22. The ink circulation pipe 28 passes through the heater 41 after passing through the heat sink 43. Ink flows through the ink circulation pipe 28 from the pressure tank 21 toward the distributor 22. The ink circulation pipe 29 connects the collector 23 and the negative pressure tank 24. Ink flows through the ink circulation pipe 29 from the collector 23 toward the negative pressure tank 24.

The ink circulation pipe 30 connects the negative pressure tank 24 and the pressure tank 21. Ink flows through the ink circulation pipe 30 from the negative pressure tank 24 toward the pressure tank 21. The ink circulation pipes 28 to 30, the distributor 22, and the collector 23 constitute a circulation path for circulating ink among the pressure tank 21, the line head 11, and the negative pressure tank 24.

The ink supply unit 40 supplies the ink in the ink cartridge 46 to the negative pressure tank 24 of the ink circulation unit 20 through an ink supply pipe 48 while an ink supply valve 47 is open.

The pressure application unit 5 applies pressure to circulate ink to the air layer 31 of the pressure tank 21 and the air layer 36 of the negative pressure tank 24. The pressure application unit 5 can cause the air layer 31 of the pressure tank 21 and the air layer 36 of the negative pressure tank 24 to be blocked from and to communicate with the atmosphere individually.

The pressure application unit 5 can apply positive pressure to the air layer 31 of the pressure tank 21 via the pressure communication pipe 58. In addition, the pressure application unit 5 can apply negative pressure to the air layer 36 of the negative pressure tank 24 via the negative pressure communication pipe 59.

By the pressure application unit 5 adjusting positive pressure and negative pressure, a meniscus is formed at the ejection port of each nozzle of the inkjet heads 16*a* and 16*b*.

In the present embodiment, in order to maintain nozzle pressure applied to each of the inkjet heads 16*a* and 16*b* within a range in which stable ejection can be performed, the pressure application unit 5 adjusts the positive pressure and the negative pressure, and adjusts the diameter of ink communication paths connected to each of the inkjet heads 16*a* and 16*b* to provide differences in flow path resistance, to equalize an average nozzle pressure of the inkjet head 16*a* and an average nozzle pressure of the inkjet head 16*b*.

However, even if the average nozzle pressure of the inkjet head 16*a* and the average nozzle pressure of the inkjet head 16*b* are equalized in this manner, a pressure difference remains between the nozzles at the lower end of the vertically upper inkjet head 16*a* and the nozzles at the upper end of the vertically lower inkjet head 16*b* as described above. In particular, in the case that the average nozzle pressure of the inkjet head 16*a* and the average nozzle pressure of the inkjet head 16*b* are equalized as described above, the pressure difference will be greater than prior to the equalization. Note that although adjustment of the nozzle pressures of the pair of inkjet heads 16*a* and 16*b* has been described here, the same applies to the pair of inkjet heads 16*c* and 16*d*, and the pair of inkjet heads 16*e* and 16*f*.

Therefore, at the joint portions between the inkjet heads 16 which are adjacent to each other in the vertical direction, there is a large difference in nozzle pressures between adjacent nozzles, and differences in the drop distances of ink droplets causes white streaks due to shifting of the landing positions thereof.

Therefore, in the present embodiment, the amounts of ink ejected from nozzles at the joint portions between vertically adjacent inkjet heads is controlled. First, control of ink ejection for the nozzles at the joint portions prior to the control of the amounts of ink will be described with reference to FIG. 5.

Although ink ejection control at the joint portion between the vertically adjacent inkjet heads 16*a* and 16*b* will be described with reference to FIG. 5, the same applies to the other vertically adjacent inkjet heads 16.

Figure 5:
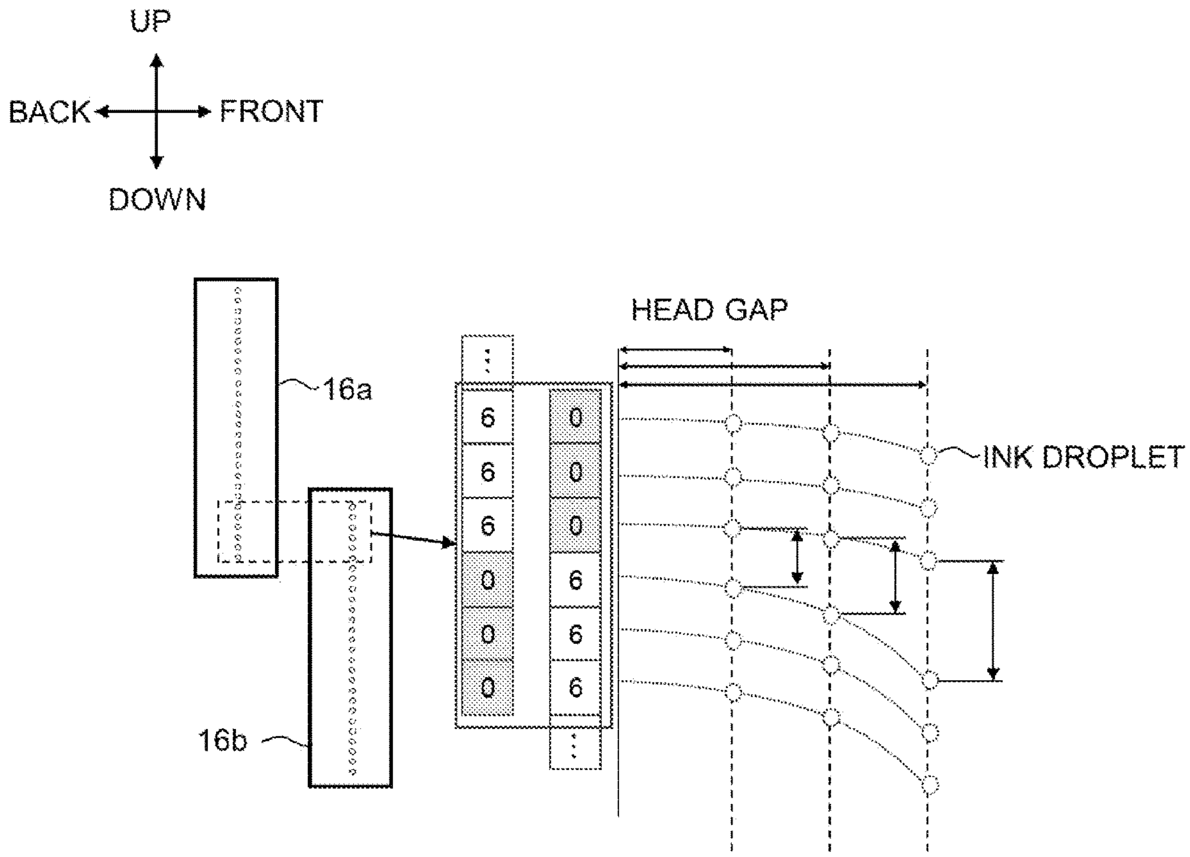
FIG. 5 is a diagram for explaining ink ejection control at a joint portion prior to control of amounts of ink.

The joint portion between the inkjet head 16*a* and the inkjet head 16*b* illustrated in FIG. 5 is the region surrounded by the square drawn with dotted lines in FIG. 5. The nozzles at the joint portion are the nozzles indicated by circles within the square drawn with dotted lines.

In the case that a straight line with a uniform density is to be printed by the line head 11, for example, from among the six nozzles of the upper inkjet head 16*a* and the lower inkjet head 16*b* that overlap in the conveyance direction (front-back direction), the amounts of ink to be ejected from the bottom three nozzles are set to “0”, and the amounts of ink to be ejected from the fourth from the bottom nozzle to the sixth nozzle are set to “6” in the upper inkjet head 16*a* according to the density of the straight line. Note that the numerical values of the amounts of ink to be ejected represents the number of ink drops to be ejected from the nozzles to form one dot.

In addition, with respect to the lower inkjet head 16*b*, the amounts of ink to be ejected by the three nozzles from the top three nozzles are set to “0”, and the amounts of ink to be ejected by the nozzles from the fourth from the top nozzle to the sixth nozzle are set to “6” according to the density of the straight line.

However, with such amounts of ink to be ejected, due to the difference in nozzle pressures between the fourth from the bottom nozzle of the inkjet head 16*a* and the fourth from the top nozzle of the inkjet head 16*b*, the drop distances of the ejected ink droplets will be different, as illustrated in FIG. 5. In addition, the difference in the drop distances of the ink droplets which are ejected from these nozzles increases as the distance (head gap) between the line head 11 and the print medium P increases.

Figure 6:
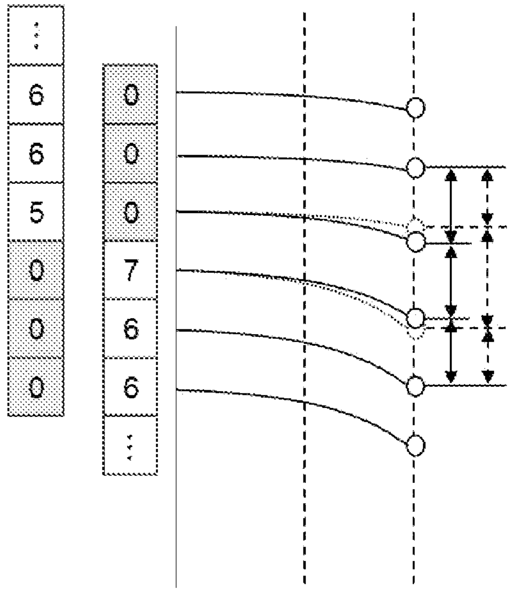
FIG. 6 is a diagram for explaining an example of control exerted on ejection amounts of ink which is ejected from nozzles at the joint portion.

Therefore, in the present embodiment, the control unit 50 controls the amounts of ink to be ejected from the nozzles such that the difference in drop distance due to the difference in nozzle pressure described above is reduced. Specifically, as illustrated in FIG. 6, the amount of ink to be ejected by the fourth from the bottom nozzle of the inkjet head 16*a* is decreased to “5”. As a result, the nozzle pressure of this nozzle can be decreased such that the drop distance of the ink droplet can be increased, as illustrated in FIG. 6. Meanwhile, the amount of ink to be ejected by the fourth from the top nozzle of the inkjet head 16*b* is increased to “7”. As a result, the nozzle pressure of this nozzle can be increased, such that the drop distance of the ink droplet can be decreased.

That is, as illustrated in FIG. 6, by increasing the drop distance of the ink droplets ejected from the upper nozzles of the joint portion and decreasing the drop distance of the ink droplets ejected from the lower nozzles of the joint portion, the intervals among the landing positions of the ink droplets ejected from these nozzles can be narrowed. As a result, it is possible to suppress the occurrence of white streaks due to the shifting of the landing positions described above, and it is possible to suppress deterioration in image quality.

As was described with reference to FIG. 5, the wider the gap between each of the line heads 11 to 14 and the printing surface Ps of the print medium P, the distance for the ink droplets which are ejected from the inkjet head 16 to reach the printing surface Ps becomes longer, and the distance over which the ink droplets parabolically drop increases. Therefore, the differences in the drop distances of the ink droplets which are ejected from the nozzles at the joint portion become great. In particular, in the case that the print medium P is a cardboard box, the gap is set to be wide because great damage will occur if the cardboard box collides with each of the line heads 11 to 14. Therefore, because the gap is set wide, the deviation of the landing position becomes great and more conspicuous.

Figure 7:
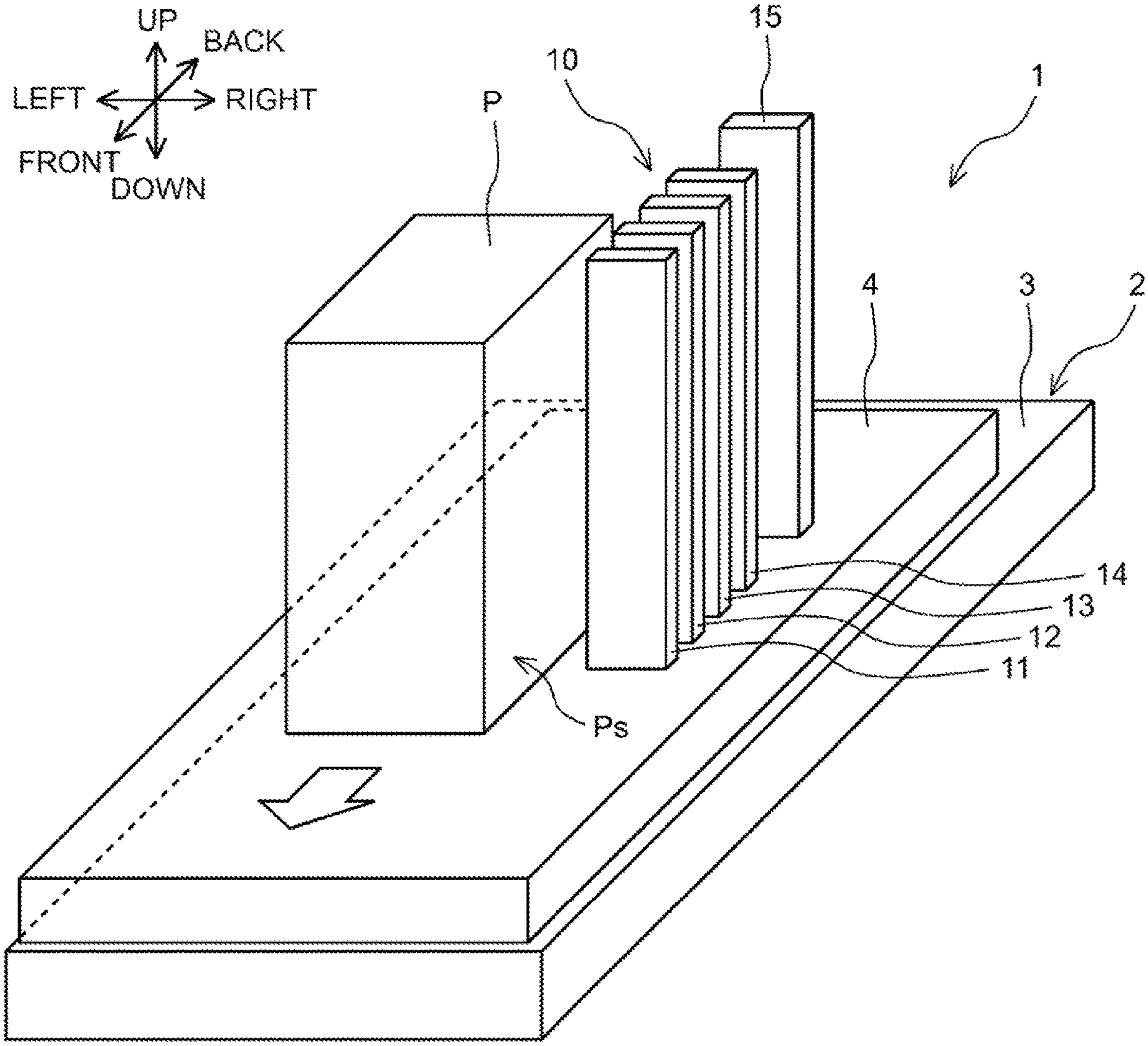
FIG. 7 is an external perspective view that illustrates the schematic configuration of a main body of an inkjet printing apparatus provided with a distance measuring unit.

Therefore, a distance measuring unit 15 may be further provided, as illustrated in FIG. 7. The distance measuring unit 15 measures the distance between the distance measuring unit 15 and the printing surface Ps of the print medium P being conveyed by the conveyance unit 2. The distance measurement unit 15 measures distance employing an optical sensor such as a laser displacement sensor. The distance measuring unit 15 is installed at the same position as the head unit 10 in the direction perpendicular to the conveyance direction (left-right direction), and practically measures the gap between the line heads 11 to 14 and the printing surface Ps of the print medium P.

Then, the control unit 50 changes the amount of ink to be ejected from the nozzles at the joint portion according to the distance measured by the distance measurement unit 15, or changes the number of nozzles of which the amounts of ink to be ejected are increased or decreased.

Specifically, in the example illustrated in FIG. 6, the amount of ink to be ejected by the fourth from the bottom nozzle of the inkjet head 16*a* is set to “5”, and the amount of ink to be ejected by the fourth from the top nozzle of the inkjet head 16*b* is set to “7”. However, if the head gap measured by the distance measuring unit 15 becomes wider, the amount of ink to be ejected by the fourth from the bottom nozzle of the inkjet head 16*a* may be set to “4”, and the amount of ink to be ejected by the fourth from the top nozzle of the inkjet head 16*b* may be set to “8”. As a result, it is possible to suppress the occurrence of white streaks due to the shifting of the landing positions of the ink droplets even in the case that the head gap measured by the distance measuring unit 15 becomes wider, and deterioration in image quality can be suppressed.

Specifically, in the example illustrated in FIG. 6, the amount of ink to be ejected by the fourth from the bottom nozzle of the inkjet head 16*a* is set to “5”, and the amount of ink to be ejected by the fourth from the top nozzle of the inkjet head 16*b* is set to “7”. However, if the head gap measured by the distance measuring unit 15 becomes wider, the amounts of ink to be ejected by the fourth and fifth from the bottom nozzles of the inkjet head 16*a* may be set to “5”, and the amounts of ink to be ejected by the fourth and fifth from the top nozzles of the inkjet head 16*b* may be set to “7”.

In the description above, the amount of ink to be ejected from the nozzles at the joint portion is changed based on the head gap measured by the distance measuring unit 15. However, the present disclosure is not limited to such a configuration. For example, a test pattern may be printed, and the shifts in the landing positions of the ink which was ejected by the nozzles at the joint portion may be actually measured based on the print results of the test pattern. The amounts of ink to be ejected by the nozzles at the joint portion may be changed based on the shifts in the landing positions.

In addition, a table in which head gaps or deviations in landing positions are correlated with the amounts of ink to be ejected by the nozzles at the joint portion may be prepared in advance. The control unit 50 may determine amounts of ink to be ejected by the nozzles at the joint portion based on the head gap measured by the distance measurement unit 15 or deviation in landing positions by referring to the table.

Further, if the head gap increases, the differences in the drop distances of the ink droplets which are ejected from the nozzles at the joint portion increase as described above. There are cases in which the generation of white streaks cannot be suppressed only by controlling the amounts of ink to be ejected by the nozzles at the joint portion as described above.

Figure 8:
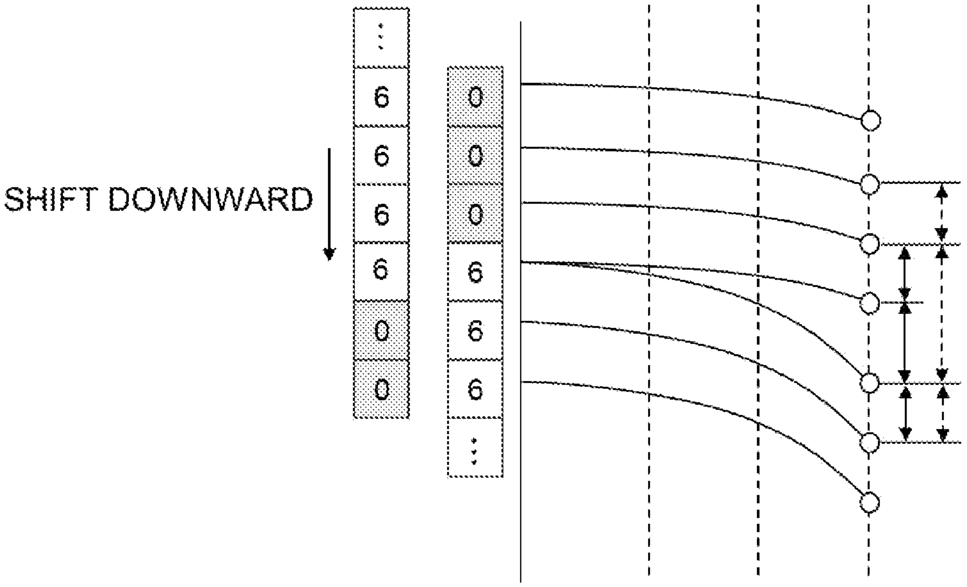
FIG. 8 is a diagram for explaining shifting of ink dot data of an upper inkjet head.
Figure 9:
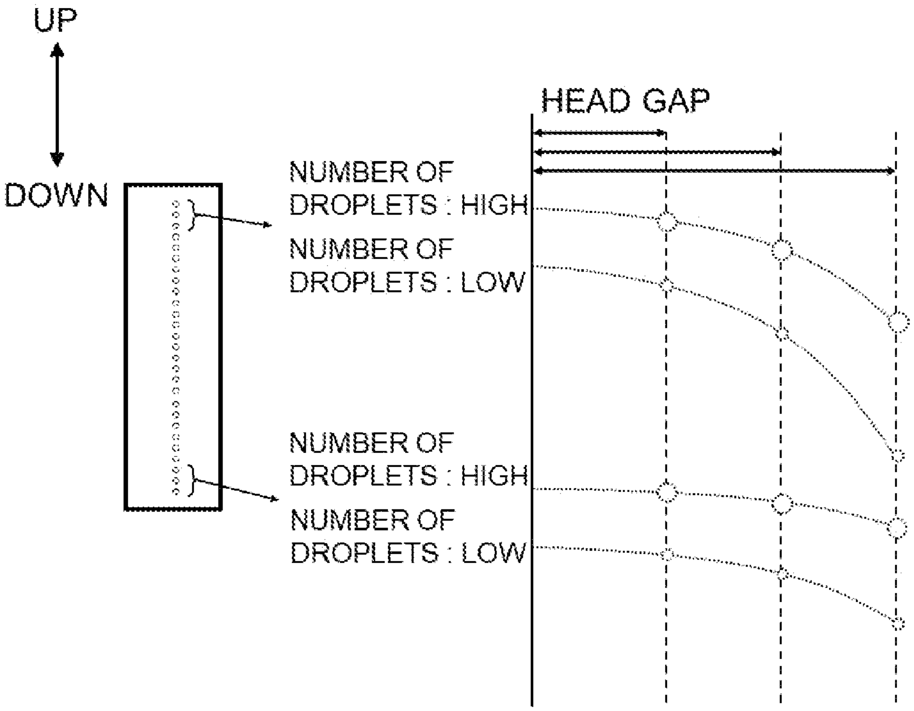
FIG. 9 is a diagram for explaining differences in drop distances of ink droplets which are ejected from vertically upper nozzles and vertically lower nozzles of one inkjet head.
Figure 10:
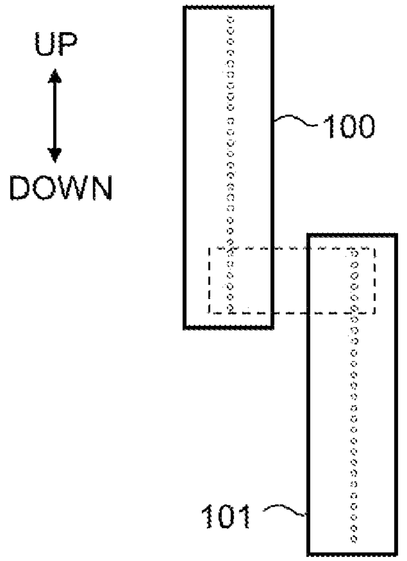
FIG. 10 is a diagram for explaining a state in which nozzles at the lower end of an upper inkjet head and nozzles at the upper end of a lower inkjet head are adjacent to each other.

Therefore, in the case that the head gap measured by the distance measurement unit 15 is greater than or equal to a preset gap threshold value, the control unit 50 may shift the ink dot data of the upper inkjet head 16*a* downward in the vertical direction as illustrated in FIG. 8, for example. The example illustrated in FIG. 8 is an example in which the ink dot data is shifted downward by one dot in the vertical direction. As a result, the differences in the drop distances of the ink droplets which are ejected from the nozzles at the joint portion (the third from the bottom nozzle of the upper inkjet head 16*a* and the fourth from the top nozzle of the lower inkjet head 16*b*) can be reduced, and it is possible to suppress the occurrence of white streaks.

Note that in the present embodiment, the control unit 50 may shift the ink dot data of the upper inkjet head 16*a* downward in the vertical direction, or conversely, may shift the ink dot data of the lower inkjet head 16*b* upward in the vertical direction.

In addition, in the description above, the ink dot data of the upper inkjet head 16*a* is shifted when the head gap measured by the distance measuring unit 15 is or greater than or equal to the preset gap threshold value. However, the present disclosure is not limited to such a configuration. For example, a preset a test pattern may be printed, and the deviation in the landing positions of the ink which was ejected by the nozzles at the joint portion may be actually measured based on the print results of the test pattern. The ink dot data of the upper inkjet head 16*a* may be shifted in the case that the measured deviation in landing positions is greater than or equal to a preset threshold value for the deviation in landing positions.

Note that although only the ink dot data is shifted in the example illustrated in FIG. 8, the amount of ink ejected from the nozzles at the joint portion may also be changed as in the embodiment described above.

In addition, the amount of shift of the ink dot data which is supplied to the upper inkjet head 16*a* or the lower inkjet head 16*b* may be changed based on the head gap measured by the distance measuring unit 15 or the actually measured deviation in landing positions. Specifically, the control unit 50 may increase the amount of shift as the head gap or the deviation in landing positions increases. As a result, even if the head gap measured by the distance measuring unit 15 becomes wider, it is possible to suppress the occurrence of white streaks due to the displacement of the landing position, thereby suppressing deterioration in image quality.

Further, a table in which head gaps or deviations in landing positions are correlated with amounts of ink dot data shift may be prepared in advance, and the control unit 50 may determine the amount of shift for ink dot data to be supplied to the upper inkjet head 16*a* or the lower inkjet head 16*b* based on the head gap measured by the distance measurement unit 15 or the actually measured deviation in landing positions by referring to the table.

Still further, in the embodiment described above, the control of ink ejection for the nozzles at the joint portions among vertically adjacent inkjet heads has been described. However, the present disclosure is not limited to application to joint portions among inkjet heads. In the case that a plurality of nozzles which are arranged in the vertical direction within a single inkjet head are sectioned, and the nozzle pressure for each of the sectioned nozzle groups is to be controlled, control of ink ejection may be performed for the nozzles at the joint portions between the nozzle groups in the same manner as the embodiment described above.

Note that the present disclosure is not limited to the embodiment described above, and can be realized by modifying constituent elements without departing from the spirit of the present disclosure when being implemented. In addition, various inventions can be formed by appropriate combinations of the plurality of constituent elements disclosed in the embodiment described above. For example, all of the constituent elements of the embodiment may be combined as appropriate. It goes without saying that various modifications and applications are possible without departing from the spirit of the present disclosure.

The following additional items are disclosed regarding the present disclosure.

(Item 1)

The droplet ejection control apparatus of the present disclosure includes:

a head unit having a plurality of vertically arranged nozzle groups in which a plurality of nozzles for ejecting droplets onto a predetermined target of ejection are arranged in the vertical direction; and a control unit for controlling ejection of the droplets from the nozzles;

the control unit controlling ejection of the droplets for vertically adjacent nozzle groups such that an amount of ejection from at least one nozzle of a vertically upper nozzle group at a joint portion between nozzle groups is reduced, and an amount of ejection from at least one nozzle at the joint portion between the nozzle groups of a vertically lower nozzle group is increased.

(Item 2)

In the droplet ejection control apparatus of Item 1, the control unit may vary the degree of decrease in the amount of ink to be ejected by at least one nozzle in the joint portion between a vertically upper nozzle group and may vary the degree of increase in the amount of ink to be ejected by at least one nozzle in the joint portion of a vertically lower nozzle group, based on the distance between the target of ejection and the head unit.

(Item 3)

In the droplet ejection control apparatus of Item 1 or Item 2, the control unit may shift the dot data for controlling the vertically upper nozzle group to the dot data for controlling the vertically lower nozzle group, or may shift the dot data for controlling the vertically lower nozzle group to the dot data for controlling the vertically upper nozzle group.

(Item 4)

The droplet ejection control apparatus of the present disclosure includes:

a head unit having a plurality of vertically arranged nozzle groups in which a plurality of nozzles for ejecting droplets are arranged in the vertical direction; and a control unit that controls ejection of the droplets from the nozzles based on dot data;

the control unit shifting dot data for controlling a vertically upper nozzle group to dot data for controlling a vertically lower nozzle group, or shifting dot data for controlling the vertically lower nozzle group to dot data for controlling the vertically upper nozzle group, for vertically adjacent nozzle groups.

(Item 5)

In the droplet ejection control apparatus of Item 4, the control unit may vary the amount of shifting of dot data for controlling a vertically upper nozzle group or a vertically lower nozzle group, based on the distance between the target of ejection and the head unit.

What is claimed is:

1. A droplet ejection control apparatus, comprising:

a head unit having a plurality of vertically arranged nozzle groups in which a plurality of nozzles for ejecting droplets onto a predetermined target of ejection are arranged in the vertical direction; and a control unit for controlling a predetermined ejection of the droplets from the nozzles;

the control unit controlling the predetermined ejection of the droplets for vertically adjacent nozzle groups such that an amount of ejection from at least one nozzle of a vertically upper nozzle group at a joint portion between nozzle groups is reduced, and an amount of ejection from at least one nozzle at the joint portion between the nozzle groups of a vertically lower nozzle group is increased.

2. The droplet ejection control apparatus as defined in claim 1, wherein:

the control unit varies the degree of decrease in the amount of ink to be ejected by at least one nozzle in the joint portion between a vertically upper nozzle group and varies the degree of increase in the amount of ink to be ejected by at least one nozzle in the joint portion of a vertically lower nozzle group, based on a distance between the target of ejection and the head unit.

3. The droplet ejection control apparatus as defined in claim 1, wherein:

the control unit shifts dot data for controlling the vertically upper nozzle group to dot data for controlling the vertically lower nozzle group, or shifts dot data for controlling the vertically lower nozzle group to the dot data for controlling the vertically upper nozzle group.

4. A droplet ejection control apparatus comprising:

a head unit having a plurality of vertically arranged nozzle groups in which a plurality of nozzles for ejecting droplets are arranged in the vertical direction; and a control unit that controls a predetermined ejection of the droplets from the nozzles based on dot data;

the control unit shifting dot data for controlling a vertically upper nozzle group to dot data for controlling a vertically lower nozzle group, or shifting dot data for controlling the vertically lower nozzle group to dot data for controlling the vertically upper nozzle group, for vertically adjacent nozzle groups.

5. The droplet ejection control apparatus as defined in claim 4, wherein:

the control unit varies the amount of shifting of dot data for controlling a vertically upper nozzle group or a vertically lower nozzle group, based on the distance between the target of ejection and the head unit.

* * * * *